(12) United States Patent
Fish

(10) Patent No.: US 7,126,469 B2
(45) Date of Patent: *Oct. 24, 2006

(54) WIRELESS FUNCTION MONITOR

(75) Inventor: Larry Fish, Emporia, KS (US)

(73) Assignee: Vektek, Inc., Emporia, KS (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/829,097

(22) Filed: Apr. 21, 2004

(65) Prior Publication Data

US 2004/0200058 A1 Oct. 14, 2004

Related U.S. Application Data

(63) Continuation-in-part of application No. 10/309,581, filed on Dec. 3, 2002, now Pat. No. 6,842,971.

(51) Int. Cl.
*G08B 1/08* (2006.01)

(52) U.S. Cl. .............. 340/539.1; 340/686.1; 340/665; 340/679; 29/714

(58) Field of Classification Search ............. 340/539.1, 340/539.21, 539.23, 683, 686.1, 689, 679, 340/666, 665; 29/714, 720, 709
See application file for complete search history.

(56) References Cited

U.S. PATENT DOCUMENTS 4,237,454 A * 12/1980 Meyer ........................ 340/682
5,053,774 A 10/1991 Schuermann et al.
5,181,423 A 1/1993 Philipps et al.
5,214,419 A 5/1993 DeMond et al.
6,204,771 B1 * 3/2001 Ceney ........................ 340/665
6,249,212 B1 6/2001 Beigel et al.
6,472,981 B1 * 10/2002 Fuge et al. .............. 340/539.1
6,728,638 B1 * 4/2004 Newman ........................ 702/5
6,839,957 B1 * 1/2005 Sticht ........................ 29/714

FOREIGN PATENT DOCUMENTS

DE   3519908   12/1986

OTHER PUBLICATIONS

Sales Brochure from discontinued product, produced by Hytec.

* cited by examiner

*Primary Examiner*—Anh V. La
(74) *Attorney, Agent, or Firm*—Hovey Williams LLP

(57) ABSTRACT

A function monitor (10) broadly comprises a detector (14) to sense a condition, a transmitter (18) to monitor the detector (14), and a base unit (20) to receive a status signal from the transmitter (18) indicative of the detector's status. The detector (14) may comprise a pressure switch, a position switch, a level switch, a temperature switch, and/or virtually any device that may be used to electrically monitor the condition. The transmitter (18) preferably receives power through a wireless connection to the base unit (20). The base unit (20) preferably receives the status signal from the pallet transmitter (18) over the wireless connection and actuates a output (30) according to the status signal. The output (30) that may be used to warn an operator of the condition, or take other necessary actions, such as preventing a pump from running.

19 Claims, 2 Drawing Sheets

WIRELESS FUNCTION MONITOR

RELATED APPLICATIONS

This application is a continuation-in-part and claims priority benefit of a application titled "PALLET PRESSURE MONITOR", Ser. No. 10/309,581, filed Dec. 3, 2002, now U.S. Pat. No. 6,842,971 hereby incorporated into the present application by specific reference.

BACKGROUND OF THE INVENTION

1. Field of the Invention

The present invention relates to function monitors. More particularly, the present invention provides a wireless function monitor capable of conveniently monitoring a condition or function and reporting the condition with no physical connections.

2. Description of Prior Art

Current methods of monitoring functions, such as fluid pressure, require wiring function detectors to signaling devices. However, detectors and signaling devices are typically mounted in different locations. For example, detectors are typically mounted below eye level near workpieces while signaling devices are typically mounted at eye-level in order to signal operators. This requires cabling between the detectors and signaling devices. Unfortunately, such cabling is often in the way of operators and obstructs vision and movement. Additionally, cabling is often damaged because it must frequently flex during machining which leads to fatigue and failure. Thus, cabling can be troublesome and must be replaced frequently.

Similar issues may arise in many other situations, thereby making it desirous to monitor a function without physical connections. For example, it is often impractical, if not impossible, to monitor conditions on moving vehicles.

Accordingly, there is a need for an improved function monitor that overcomes the limitations of the prior art.

SUMMARY OF THE INVENTION

The present invention overcomes the above-identified problems and provides a distinct advance in the art of function monitors. More particularly, the present invention provides a wireless function monitor capable of conveniently monitoring a condition or function and reporting the condition with no physical connections. The monitor broadly comprises a function detector to sense a condition, a function transmitter to monitor the detector, and a base unit to receive a status signal from the transmitter indicative of the detector's status.

For example, in a preferred first embodiment, the detector comprises a pressure switch to sense pressure within a hydraulic system of a machine. The machine preferably includes a pallet designed to support a workpiece while the workpiece is being machined or otherwise processed. The workpiece is preferably secured to the pallet by a plurality of hydraulic clamps which are actuated by forcing pressurized hydraulic fluid into the hydraulic system.

The pressure switch is preferably adjustable through an adjustment screw allowing a technician to select a pressure set-point, such as ten pounds per square inch (PSI). As pressure rises within the hydraulic system, the fluid presses against a diaphragm within the pressure switch. When the pressure reaches the set-point, the diaphragm closes a set of contacts within the pressure switch, thereby changing the detector's status.

The transmitter preferably incorporates a passive integrated circuit (IC) that receives power through a wireless connection to the base unit and monitors the detector. For example, the transmitter may receive power in the form of electromagnetic energy that powers both the IC and the detector. The transmitter responds to the detector's status by transmitting the status signal over the wireless connection. The status signal preferably includes a serial number uniquely identifying the transmitter in addition to information indicative of the detector's status. For example, the serial number may be appended with a one when the contacts of the pressure switch are closed and a zero when the contacts of the pressure switch are open.

The base unit preferably includes a power input, an electromagnetic energy transmitter (EET) to provide power to the transmitter, a signal receiver to receive the status signal from the transmitter, and at least one output actuated by the receiver according to the status signal. The EET preferably converts the power accepted through the power input into the electromagnetic energy and transmits the electromagnetic energy to the transmitter over the wireless connection. The output is preferably electrically connected to a warning unit, or other signaling device, that warns an operator of the machine when the pressure in the hydraulic system is below the set-point.

In use, the operator preferably places the workpiece on the pallet and activates the hydraulic system. A pump preferably forces the fluid into the hydraulic system, thereby actuating the clamps and the detector. The transmitter substantially continuously monitors the detector and alters the status signal accordingly. The base unit substantially continuously receives the status signal and actuates the output accordingly. Thus, when the pressure in the hydraulic system reaches the set-point, the contacts in the pressure switch preferably close, causing the status signal to change. When the status signal changes, the output also changes, causing the warning device to indicate that the workpiece is secured to the pallet and that it is now safe to machine the workpiece.

Alternatively, the detector may actually comprise multiple or different switches. For example, the detector may include a workpiece position switch to sense the position of the workpiece, instead of or in addition to the pressure switch discussed above. In this case, when the workpiece is in position, as sensed by the workpiece switch, the pump may substantially automatically actuate the clamps. More specifically, when the operator places the workpiece upon the pallet, contacts within the workpiece switch are preferably closed, thereby causing the status signal to change. When the status signal changes, the base unit changes one of the outputs, which may be used to energize and/or run the pump.

Alternatively, when the status signal changes, the base unit changes one of the outputs, which may be used to allow the operator to energize and/or run the pump. Thus, the workpiece switch may be used as a safety device by preventing the clamps from being actuated until the workpiece is properly positioned. In either case, the pressure switch may still be used to change the status signal, such that the warning device indicates that the workpiece is secured to the pallet, as discussed above. For example, the status signal may include the serial number followed by two digits indicative of the detector's status, one digit for each switch.

The detector may also include a level switch to sense a fluid level of the hydraulic fluid in a reservoir that supplies the pump. For example, when the fluid level is too low, one of the outputs of the base unit may be used to prevent the pump from running.

The detector may also include a clamp position switch to sense a position of the clamps. Furthermore, the monitor may include all of the switches discussed above and may be used as part of an automated manufacturing process. More specifically, the clamp switch may be used or confirm that the clamps are in a retracted position. With the clamps in the retracted position, a robotic arm may be used to place the workpiece. The workpiece switch may be used to confirm that the workpiece has been properly placed. With the workpiece properly placed, the pump may be energized, provided the level switch confirms a sufficient fluid level in the reservoir. When the pressure switch confirms that the hydraulic system is sufficiently pressurized, and therefore the clamps are holding the workpiece, the machine may be instructed to perform a machining operation on the workpiece. Additionally, another clamp switch may be used to determine than the clamps are in a clamping position. Once the machining operation is complete, the above procedure may be reversed.

The functionality described above is essentially accomplished with the detector comprising two or more switches. The functionality may also be accomplished using two or more substantially independent monitors. Alternatively, the functionality may also be accomplished using two or more detectors, two or more transmitters, and one only base unit. In any case, the serial number may be used to identify the transmitter, thereby identifying the detectors or switches of the detectors.

Rather than modifying the status signal, as described above, the detector could be used to energize the transmitter. More specifically, the above description essentially assumes the transmitter substantially continuously receives the electromagnetic energy and powers the detector and IC with the electromagnetic energy. However, the detector may be electrically coupled with the IC, such that the IC is only powered when the transmitter receives the electromagnetic energy and the detector has been actuated. In this case, the status signal may not need to include any information beyond the serial number, since reception of the serial number would be predicated on the detector being actuated.

In a preferred second embodiment, the monitor may be used to sense temperature in a refrigerated railcar. The railcar may include a refrigeration unit designed to refrigerate contents of the railcar, such as perishable foods. If the refrigeration unit fails, the temperature in the railcar will likely rise, thereby potentially spoiling the food.

In the second embodiment, the detector preferably comprises a temperature switch with a sensing element inside the railcar. The temperature switch may be adjustable allowing a technician to select a temperature set-point. When the temperature reaches the set-point, the temperature switch actuates and closes a set of contacts within the temperature switch, thereby changing the detector's status.

The transmitter and the base unit are preferably substantially as described above. The output is preferably electrically connected to a warning unit, or other signaling device, that warns the operator or other interested party when the temperature in the railcar is above the set-point, thereby indicating a possible failure of the refrigeration unit.

In a preferred third embodiment, the monitor may be used to sense air pressure in a commercial truck's air brake system. The truck may include an air compressor that supplies compressed air to be stored in a tank and used to control the brake system. If the compressor fails or there is a leak in the brake system, the pressure in the tank will drop.

In the third embodiment, the detector preferably comprises a pressure switch sensing the pressure in the tank. The pressure switch may be adjustable allowing a technician to select a pressure set-point. When the pressure reaches the set-point, the pressure switch actuates and closes a set of contacts within the pressure switch, thereby changing the detector's status.

The transmitter and the base unit are preferably substantially as described above. The output is preferably electrically connected to a warning unit, or other signaling device, that warns the operator or another interested party when the pressure in the tank is below the set-point, thereby indicating a possible failure of the compressor or leak in the brake system.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
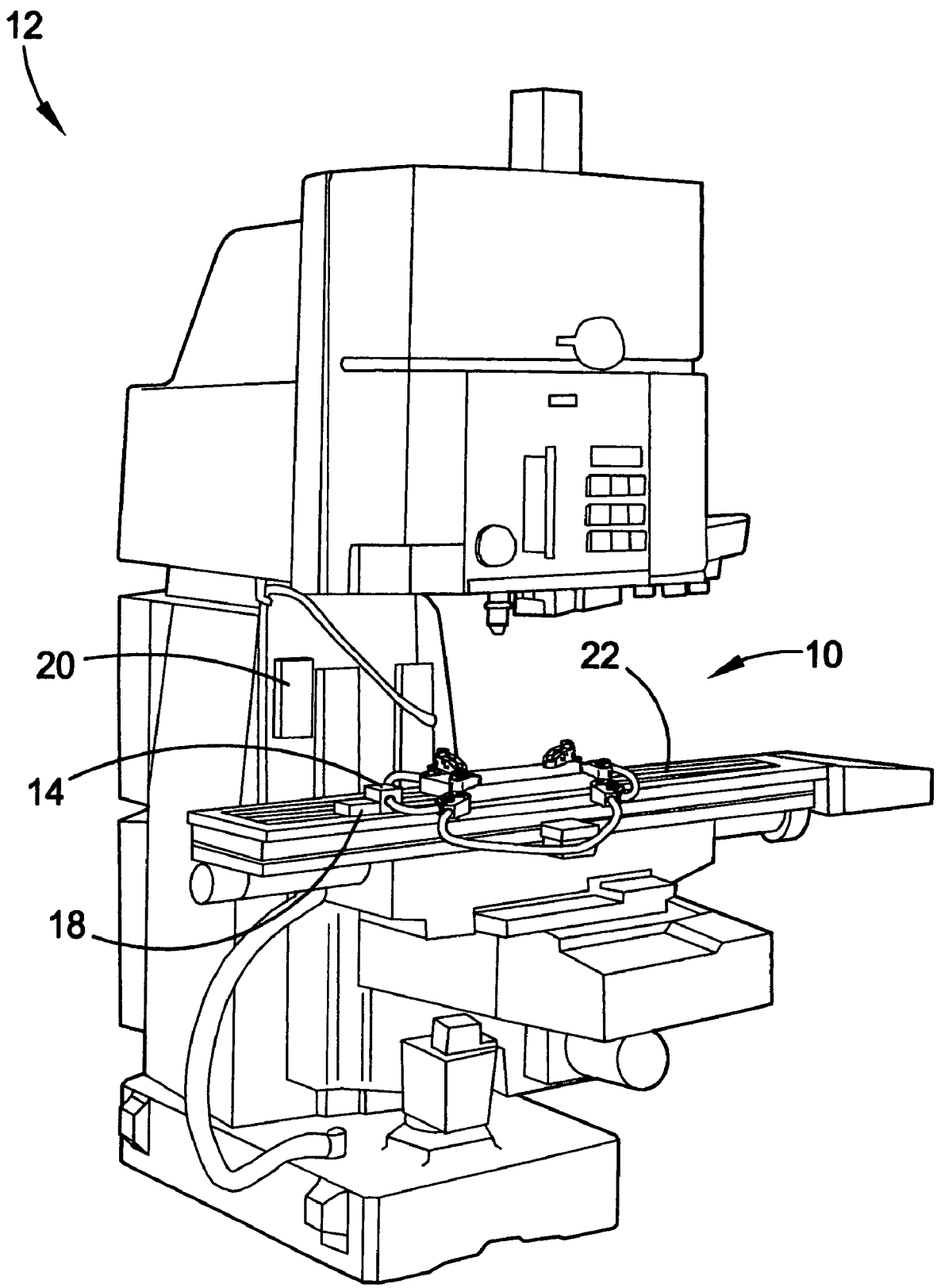
FIG. 1 is a perspective view of a pallet pressure monitor constructed in accordance with a preferred embodiment of the present invention and shown installed on a machine.
Figure 2:
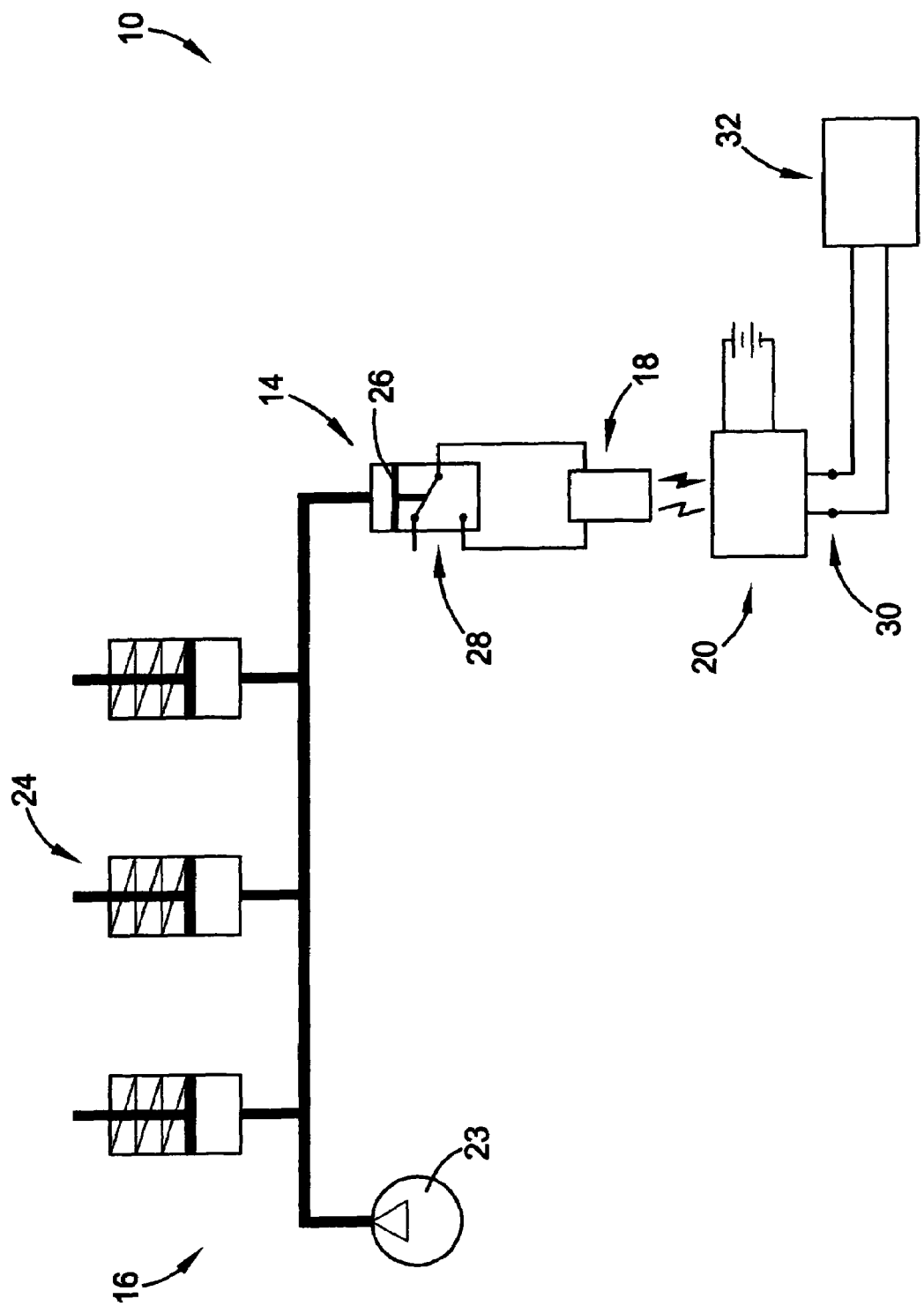
FIG. 2 is a combination hydraulic and electrical schematic of the monitor.

Referring to FIG. 1, the preferred function monitor 10 constructed in accordance with a preferred first embodiment of the present invention is illustrated installed on a machine 12. Referring also to FIG. 2, the monitor 10 broadly comprises a function detector 14 to sense a condition, a function transmitter 18 to monitor the detector 14, and a base unit 20 to receive a status signal from the transmitter 18 indicative of the detector's 14 status.

The machine 12 may be similar to that disclosed in "UNIVERSAL MILLING MACHINE", U.S. Pat. No. 3,998,127, incorporated herein by reference, and preferably includes a pallet 22 designed to support a workpiece while the workpiece is being machined or otherwise processed by the machine 12. The workpiece is preferably secured to the pallet 22 by a plurality of hydraulic clamps 24, such as those disclosed in "HYDRAULIC SWING CLAMP APPARATUS HAVING SPEED CONTROL MECHANISM", U.S. Pat. No. 5,695,177, incorporated herein by reference.

The workpiece is typically only secured to the pallet 22 when pressure is applied to a hydraulic system 16 of the machine 12. For example, a pump 23 may be used to actuate the clamps 24 by forcing pressurized hydraulic fluid into the hydraulic system 16. Therefore, in the interest of safety, the workpiece is preferably only machined or otherwise processed by the machine 12 while the pressure is applied to the hydraulic system 16. Thus, the monitor 10 of the present invention preferably indicates when it is safe to machine the workpiece by indicating when the pressure is applied to the hydraulic system 16.

In the preferred first embodiment, the detector 14 preferably comprises an adjustable pressure switch in fluid communication with the hydraulic system 16. The pressure switch is preferably adjustable through an adjustment screw and may be similar to that disclosed in "PRESSURE SWITCH WITH SNAP-TOGGLE ADJUSTING MEANS", U.S. Pat. No. 4,052,574, incorporated herein by reference. Such adjustability allows a technician to select a pressure set-point, such as ten pounds per square inch (PSI). For example, as pressure rises within the hydraulic system 16, the fluid presses against a diaphragm 26 within the pressure switch. When the pressure reaches the set-point, the diaphragm 26 preferably closes a set of contacts 28 within the pressure switch. In this case, the pressure switch operates as a normally open switch. Alternatively, the pressure switch may operate as a normally closed switch and open the contacts 28 when the pressure reaches the set-point. In either case, the pressure switch provides a discrete pressure signal representative of the detector's 14 status, or the pressure within the hydraulic system 16 as compared with the set-point.

The transmitter 18 preferably incorporates a passive integrated circuit (IC) that receives power through a wireless connection to the base unit 20. For example, the transmitter 18 may receive power in the form of electromagnetic energy at approximately 126 kilohertz (KHz). The electromagnetic energy is preferably the only power provided to the transmitter 18 and used to power both the IC and the detector 14. The IC preferably monitors the detector 14 and responds by transmitting the status signal. The status signal may include a serial number uniquely identifying the transmitter 18 and a status number reflecting the pressure signal. For example, the status number may be a one when the contacts 28 of the pressure switch are closed and a zero when the contacts 28 of the pressure switch are open.

The base unit 20 preferably includes a power input, an electromagnetic energy transmitter (EET) to provide power to the transmitter 18, a signal receiver to receive the status signal from the transmitter 18, and at least one output 30 actuated by the receiver according to the status signal. The power input preferably accepts power at approximately twenty-four volts which may be either direct current or alternating current. The EET preferably converts the power accepted through the power input into the electromagnetic energy and transmits the electromagnetic energy to the transmitter 18.

The output 30 preferably comprises a relay electrically connected to a warning unit 32, or other signaling device, that warns an operator of the machine 12 when the pressure in the hydraulic system 16 is below the set-point. The output 30 is preferably able to withstand significant current flow, such as five amps, so that the output 30 may be used to drive most any signaling device. Thus, the warning unit 32 may incorporate lights, sirens, and/or other indicators.

As discussed above, the base unit 20 preferably transmits the electromagnetic energy to the transmitter 18 which responds by transmitting the status signal back to the base unit 20. Thus, a separation distance between the transmitter 18 and the base unit 20 can be critical. In order to minimize power requirements and external interference, the separation distance is preferably no greater than approximately twelve inches. More specifically, in order to ensure reliable operation of the monitor 10, the separation distance is preferably between five and eight inches.

It is also important to note that the transmitter 18 is preferably offset from the pallet 22 itself. The pallet 22 is typically constructed of metal and may therefore interfere with the operation of the transmitter 18. Thus, the transmitter 18 is preferably offset from the pallet 22 by at least one quarter inch. While there is no theoretically maximum offset, practicality typically limits the offset to approximately eight inches. The offset is preferably embodied by an air gap, but may be embodied by virtually any nonmetallic material, such as plastic.

As discussed above, the status signal may include the serial number in addition to the status number. Thus, the base unit 20 may identify the transmitter 18. It follows that the base unit 20 may be used with and uniquely identify more than one transmitter 18. For example, the base unit 20 may communicate with a first transmitter monitoring a first detector having a five PSI set-point and a second transmitter monitoring a second detector having a fifty PSI set-point. In this case, the base unit 20 may be used to indicate when the pressure within the hydraulic system 16 is below five PSI, between five and fifty PSI, and over fifty PSI. Additionally, the base unit 20 may communicate with several transmitters monitoring detectors in fluid communication with several different hydraulic systems. Furthermore, as will be discussed in more detail below, the transmitter 18 may monitor multiple switches or other devices used as the detector 14.

In use, the operator preferably places the workpiece on the pallet 22 and activates the hydraulic system 16. The pump 23 preferably forces the fluid into the hydraulic system 16, thereby actuating the clamps 24 and the detector 14. The transmitter 18 preferably substantially continuously monitors the detector 14 and alters the status signal accordingly. The base unit 20 preferably substantially continuously receives the status signal and actuates the output 30 accordingly. Thus, when the pressure in the hydraulic system 16 reaches the set-point, the contacts 28 in the pressure switch preferably close, causing the status signal to change. When the status signal changes, the output 30 also changes, causing the warning device 32 to indicate that the workpiece is secured to the pallet 22 and that it is now safe to machine the workpiece.

Alternatively, the detector 14 may actually comprise multiple or different switches. For example, the detector 14 may include a workpiece position switch to sense the position of the workpiece, instead of or in addition to the pressure switch discussed above. In this case, the workpiece switch provides a discrete workpiece signal representative of the detector's 14 status, or the position of the workpiece. When the workpiece is in position, as sensed by the workpiece switch, the pump 23 may be used to actuate the clamps 24, automatically or manually. For example, when the operator places the workpiece upon the pallet 22, contacts within the workpiece switch are preferably closed, thereby causing the workpiece signal and the status signal to change. When the status signal changes, the base unit 20 changes one of the outputs 30, which may be used to energize and/or run the pump 23.

Alternatively, when the status signal changes, the base unit 20 changes one of the outputs 30, which may be used to allow the operator to energize and/or run the pump 23. Thus, the workpiece switch may be used as a safety device by preventing the clamps 24 from being actuated until the workpiece is properly positioned. In either case, the pressure switch may still be used to change the status signal, such that the warning device 32 indicates that the workpiece is secured to the pallet 22, as discussed above. For example, the status signal may include the serial number followed by two digits indicative of the detector's 14 status, one digit for each switch.

The detector 14 may also include a level switch to sense a fluid level of the hydraulic fluid in a reservoir that supplies the pump 23. In this case, the level switch provides a discrete level signal representative of the detector's 14 status, or the level of the fluid in the reservoir. For example, when the fluid level is too low, one of the outputs 30 of the base unit 20 may be used to prevent the pump 23 from running, as described above.

The detector 14 may also include a clamp position switch to sense a position of the clamps 24. In this case, the clamp switch provides a discrete workpiece signal representative of the detector's 14 status, or the position of the clamps 24.

Furthermore, the monitor 10 may include all of the switches discussed above and may be used as part of an automated manufacturing process. More specifically, the clamp switch may be used or confirm that the clamps 24 are in a retracted position. With the clamps 24 in the retracted position, a robotic arm may be used to place the workpiece. The workpiece switch may be used to confirm that the workpiece has been properly placed. With the workpiece properly placed, the pump 23 may be energized, provided the level switch confirms a sufficient fluid level in the reservoir. When the pressure switch confirms that the hydraulic system 16 is sufficiently pressurized, and therefore the clamps 24 are holding the workpiece, the machine 12 may be instructed to perform a machining operation on the workpiece. Additionally, another clamp switch may be used to determine than the clamps 24 are in a clamping position. Once the machining operation is complete, the above procedure may be reversed.

The functionality described above is essentially accomplished with the detector 14 comprising two or more switches. The functionality may also be accomplished using two or more substantially independent monitors 10. Alternatively, the functionality may also be accomplished using two or more detectors 14, two or more transmitters 18, and one only base unit 20. In any case, the serial number may be used to identify the transmitter 18, thereby identifying the detectors 14 or switches of the detectors 14.

In a preferred second embodiment, the monitor 10 may be used to sense temperature in a refrigerated railcar. The railcar may include a refrigeration unit designed to refrigerate contents of the railcar, such as perishable foods. If the refrigeration unit fails, the temperature in the railcar will likely rise, thereby potentially spoiling the food.

In the second embodiment, the detector 14 preferably comprises a temperature switch with a sensing element inside the railcar. The temperature switch may be adjustable allowing a technician to select a temperature set-point. In this case, the temperature switch provides a discrete temperature signal representative of the detector's 14 status, or the temperature in the railcar. For example, when the temperature reaches the set-point, the temperature switch actuates and closes a set of contacts within the temperature switch, thereby changing the detector's 14 status.

The transmitter 18 and the base unit 20 are preferably substantially as described above. The output 30 is preferably electrically connected to a warning unit, or other signaling device, that warns the operator or other interested party when the temperature in the railcar is above the set-point, thereby indicating a possible failure of the refrigeration unit.

In a preferred third embodiment, the monitor 10 may be used to sense air pressure in a commercial truck's air brake system. The truck may include an air compressor that supplies compressed air to be stored in a tank and used to control the brake system. If the compressor fails or there is a leak in the brake system, the pressure in the tank will drop.

In the third embodiment, the detector 14 preferably comprises a pressure switch sensing the pressure in the tank. The pressure switch may be adjustable allowing a technician to select a pressure set-point. In this case, the pressure switch provides a discrete pressure signal representative of the detector's 14 status, or the pressure in the tank. For example, when the pressure reaches the set-point, the pressure switch actuates and closes a set of contacts within the pressure switch, thereby changing the detector's 14 status.

The transmitter 18 and the base unit 20 are preferably substantially as described above. The output 30 is preferably electrically connected to a warning unit, or other signaling device, that warns the operator or another interested party when the pressure in the tank is below the set-point, thereby indicating a possible failure of the compressor or leak in the brake system.

Rather than modifying the status signal, as described above, the detector 14 could be used to energize the transmitter 18. More specifically, the above description essentially assumes the transmitter 18 substantially continuously receives the electromagnetic energy and powers the detector 14 and IC with the electromagnetic energy. However, the detector 14 may be electrically coupled with the IC, such that the IC is only powered when the transmitter 18 receives the electromagnetic energy and the detector 14 has been actuated. In this case, the status signal may not need to include any information beyond the serial number, since reception of the serial number would be predicated on the detector 14 being actuated.

Since the transmitter 18 and the base unit 20 transmit and receive the status signal and the electromagnetic energy, one with ordinary skill in the art would recognize that the transmitter 18 and the base unit 20 must incorporate antennas, in some form. It is important to note that the separation distance and the offset referred to above is critical only for the antennas. In the preferred embodiment, the antennas are integral to the transmitter 18 and the base unit 20. Thus, the separation distance and the offset apply to the transmitter 18 and the base unit 20, as described above. However, the antennas are not required to be integral to the transmitter 18 or the base unit 20. Thus, it is possible to install the antennas with the separation distance and the offset referred to above and have the remaining portions of the transmitter 18 and the base unit 20 installed at other distances.

While the present invention has been described above, it is understood that substitutions may be made. For example, the output 30 may actually be used to turn the machine 12 on or off, thereby insuring that the workpiece is secured to the pallet 22 before allowing the workpiece to be machined. Additionally, the power input of the base unit 20 may accept power at other voltages, as a matter of design. Furthermore, the transmitter 18 and the base unit 20 may utilize different frequencies, provided that they communicate and the transmitter 18 receives power over the wireless connection.

Finally, the monitor 10 may use devices other than switches. For example, the detector 14 may include analog instruments using an analog to digital converter to produce a digital signal. More specifically, the status number may represent the digital signal, and therefore vary within a range, such as between zero and four thousand ninety five, according to the analog instrument's output. These and other minor modifications are within the scope of the present invention.

Having thus described a preferred embodiment of the invention, what is claimed as new and desired to be protected by Letters Patent includes the following:

1. A function monitor capable of detecting a condition and reporting the condition over a wireless connection, the monitor comprising:

a detector operable to electrically respond to the condition;

a transmitter operable to be electrically coupled with the detector and indicate the detector's status by transmitting a status signal over the wireless connection; and a base unit operable to substantially continuously power the transmitter over the wireless connection, receive the status signal from the transmitter over the wireless connection, and discern the detector's status from the status signal.

2. The monitor as set forth in claim 1, wherein the detector includes an adjustable pressure switch operable to respond when pressure within a hydraulic system reaches an adjustable set-point.

3. The monitor as set forth in claim 1, wherein the transmitter transmits the status signal indicative of the detector's status using only power wirelessly received from the base unit.

4. The monitor as set forth in claim 1, wherein the detector includes a position switch operable to sense when a workpiece is properly positioned.

5. The monitor as set forth in claim 1, wherein the detector includes a position switch operable to sense when a clamp is properly positioned in order to determine whether it is safe to manipulate a workpiece.

6. The monitor as set forth in claim 1, wherein the detector includes a level switch operable to sense a fluid level in a hydraulic system in order to prevent a pump from running when insufficient fluid is available.

7. The monitor as set forth in claim 1, wherein the detector includes a temperature switch operable to sense a temperature in a railcar and the monitor is used to monitor the temperature in order to report failure of the railcar's refrigeration unit.

8. The monitor as set forth in claim 1, wherein the transmitter modifies the status signal in response the detector being actuated.

9. The monitor as set forth in claim 1, wherein the status signal includes a serial number identifying the transmitter and information indicative of the detector's status.

10. The monitor as set forth in claim 1, wherein the transmitter only transmits the status signal in response the detector being actuated.

11. The monitor as set forth in claim 1, wherein the status signal consists of information identifying the transmitter.

12. A monitor operable to process a workpiece, the machine comprising:
   a detector operable to electrically respond to pressure within a hydraulic system of the machine;
   a transmitter electrically coupled with the detector, and operable to indicate the detector's status; and
   a base unit mounted at a separation distance from the transmitter and operable to substantially continuously power the transmitter over a wireless connection and discern the detector's status over the wireless connection.

13. The machine as set forth in claim 12, wherein the detector includes a pressure switch operable to respond when pressure within the hydraulic system reaches a set-point.

14. The machine as set forth in claim 12, wherein the base unit substantially continuously wirelessly transmits electromagnetic energy to the transmitter and the electromagnetic energy powers the transmitter.

15. The machine as set forth in claim 12, wherein the transmitter transmits a status signal indicative of the detector's status using only power wirelessly received from the base unit.

16. The machine as set forth in claim 12, wherein the detector includes a position switch operable to sense when the workpiece is properly positioned.

17. The machine as set forth in claim 12, wherein the detector includes a position switch operable to sense when a clamp of the machine is properly positioned.

18. The machine as set forth in claim 12, wherein the detector includes a level switch operable to sense a fluid level of the hydraulic system.

19. A function monitor capable of detecting a condition and reporting the condition over a wireless connection, the monitor comprising:
   an adjustable pressure switch operable to electrically respond when pressure within a hydraulic system reaches an adjustable set-point;
   a position switch operable to sense when a workpiece is properly positioned;
   a position switch operable to sense when a clamp is properly positioned;
   a level switch operable to sense a fluid level of the hydraulic system;
   a transmitter electrically coupled with the switches, and operable to transmit a status signal indicative of the switches' status over a wireless connection; and
   a base unit mounted within eight inches of the transmitter and operable to substantially continuously transmit electromagnetic energy over the wireless connection which powers the transmitter, receive the status signal, and actuate at least one output according to the switches' status as indicated by the status signal received from the transmitter.

* * * * *